United States Patent
Gamblin et al.

(10) Patent No.: US 7,789,955 B1
(45) Date of Patent: Sep. 7, 2010

(54) INKJET INK COMPOSITION

(75) Inventors: Lawrence R. Gamblin, Cincinnati, OH (US); Stanley Nowacki, Cincinnati, OH (US); Brigette Senter, Cincinnati, OH (US); Simone Wieczorek, Cincinnati, OH (US)

(73) Assignee: Collins Ink Corporation, Cincinnati, OH (US)

( * ) Notice: Subject to any disclaimer, the term of this patent is extended or adjusted under 35 U.S.C. 154(b) by 265 days.

(21) Appl. No.: 11/407,462

(22) Filed: Apr. 20, 2006

(51) Int. Cl.
*C09D 11/00* (2006.01)

(52) U.S. Cl. .......... 106/31.6; 106/31.75; 106/31.76; 106/31.78; 106/31.85; 106/31.86; 106/31.89; 347/100

(58) Field of Classification Search .......... 523/160; 106/31.6, 31.78, 31.75, 31.76, 31.86, 31.89; 347/100

See application file for complete search history.

(56) References Cited

U.S. PATENT DOCUMENTS

| | | | | |
|---|---|---|---|---|
| 6,077,339 A | * | 6/2000 | Nyssen et al. | 106/31.77 |
| 6,599,356 B2 | * | 7/2003 | Komatsu et al. | 106/493 |
| 2004/0261658 A1 | * | 12/2004 | Rehman | 106/31.43 |
| 2005/0036021 A1 | * | 2/2005 | Ito et al. | 347/100 |
| 2006/0075926 A1 | * | 4/2006 | Aoki | 106/31.49 |

FOREIGN PATENT DOCUMENTS

EP 1609828 A1 * 12/2005

EP 1148104 B1 * 2/2007

OTHER PUBLICATIONS http://www.ppimagepro.com/InkjetCartridgeEpson.html.*
Cabot: Black Pearls® L Pigment.*
Cabot: Cab-O-Jet® Pigments.*
Cabot: Inkjet Colorants (http://w1.cabot-corp.com/controller.jsp?entry=product&N=23+4294967118+1000).*

* cited by examiner

*Primary Examiner*—David Wu
*Assistant Examiner*—Vu A Nguyen
(74) *Attorney, Agent, or Firm*—Alfred J. Mangels

(57) ABSTRACT

A pigment-based ink composition including a colorant, a cyclic amide represented by the formula:

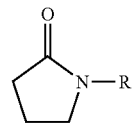

wherein R is at least one of $CH_3$, $C_2H_5$, $C_3H_9$, $C_4H_9$, $C_5H_{11}$, $C_6H_{13}$, $C_7H_{15}$, and $C_8H_{17}$, and together with the N atom to which it is attached forms a 5 member ring; an organic solvent; an amine; a biocide; first and second surfactants; and water. The ink is utilized in inkjet printing, it does not include resins or polymers, and it provides substantially permanent images on both porous and nonporous substrates.

22 Claims, 3 Drawing Sheets

| Table 1 | Ink | Compositions | For Inkjet Technology | Hewlett-Packard 45A |
|---|---|---|---|---|
| | A | B | C | D |
| Ingredient | Black | Color | Comparative-Black | Comparative-Color |
| Water | 54.55 | 73.05 | 74.55 | 74.55 |
| Kathon | 0.02 | 0.02 | 0.02 | 0.02 |
| Methanol | 10 | 10 | 10 | 10 |
| Amp-95 | 0.03 | 0.03 | 0.03 | 0.03 |
| NEP | 20 | | | |
| NOP | | 1.5 | | |
| Tergitol 15-S-9 | 0.4 | 0.4 | 0.4 | 0.4 |
| CAB-O-Jet 300 | 15 | | 15 | 15 |
| CAB-O-JET 250C Cyan | | 15 | | |

| Table 1 | Ink | Compositions | For Inkjet Technology | Hewlett-Packard 45A |
|---|---|---|---|---|
|  | A | B | C | D |
| Ingredient | Black | Color | Comparative-Black | Comparative-Color |
| Water | 54.55 | 73.05 | 74.55 | 74.55 |
| Kathon | 0.02 | 0.02 | 0.02 | 0.02 |
| Methanol | 10 | 10 | 10 | 10 |
| Amp-95 | 0.03 | 0.03 | 0.03 | 0.03 |
| NEP | 20 |  |  |  |
| NOP |  | 1.5 |  |  |
| Tergitol 15-S-9 | 0.4 | 0.4 | 0.4 | 0.4 |
| CAB-O-Jet 300 | 15 |  | 15 | 15 |
| CAB-O-JET 250C Cyan |  | 15 |  |  |

Fig. 1

| Reference # | Substrate Name |
|---|---|
| 1 | Aqueous Cork Satin on 120# Centura Gloss Cover |
| 2 | Aqueous Gans Satin on 120# Centura Gloss Cover |
| 3 | Aqueous Cork Matte Dull on 120# Centura Gloss Cover |
| 4 | Aqueous Cork Gloss on 120# Centura Gloss Cover |
| 5 | Aqueous Gans Gloss on 120# Centura Gloss Cover |
| 6 | Aqueous NiCoat Hi Gloss on 120# Centura Gloss Cover |
| 7 | Aqueous Prisco Gloss on 120# Centura Gloss Cover |
| 8 | Aqueous Diamond Varnish on 120# Centura Gloss Cover |
| 9 | Gans Special Dull Varnish on 120# Centura gloss Cover |
| 10 | Gans Satin OP Varnish on 120# Centura Gloss Cover |
| 11 | Ink Systems S/F – HD - Gloss OP Varnish on 120# Centura Gloss Cover |
| 12 | Ink Systems SF. HI Gloss O/P Varnish on 120# Centura Gloss Cover |
| 13 | Untreated PVC |
| 14 | Pearlized PVDC |

Fig. 2

| Substrates | 1 | | 2 | | 3 | | 4 | | 5 | | 6 | | 7 | | 8 | | 9 | | 10 | | 11 | | 12 | | 13 | | 14 | |
|---|---|---|---|---|---|---|---|---|---|---|---|---|---|---|---|---|---|---|---|---|---|---|---|---|---|---|---|---|
| Ink | A | B | A | B | A | B | A | B | A | B | A | B | A | B | A | B | A | B | A | B | A | B | A | B | A | B | A | B |
| Print Quality | 5 | 0 | 5 | 0 | 5 | 0 | 5 | 0 | 5 | 0 | 5 | 0 | 5 | 0 | 5 | 0 | 5 | 0 | 4 | 0 | 5 | 0 | 5 | 0 | 5 | 0 | 3 | 0 |
| Build-up | 5 | N/A | 5 | N/A | 5 | N/A | 5 | N/A | 5 | N/A | 5 | N/A | 5 | N/A | 5 | N/A | 5 | N/A | 5 | N/A | 5 | N/A | 5 | N/A | 5 | N/A | 5 | N/A |
| Decap | 4 | N/A | 4 | N/A | 4 | N/A | 4 | N/A | 4 | N/A | 4 | N/A | 4 | N/A | 4 | N/A | 4 | N/A | 4 | N/A | 4 | N/A | 4 | N/A | 4 | N/A | 4 | N/A |
| Water Resistance | 4 | 1 | 4 | | 4 | 2 | 4 | 2 | 4 | 2 | 4 | 1 | 4 | 1 | 3 | 2 | 3 | 2 | 3 | 2 | 3 | 2 | 3 | 2 | 4 | 2 | 4 | 2 |
| Dry Rub - Q tip | 5 | 5 | 5 | 5 | 5 | 5 | 5 | 5 | 5 | 5 | 5 | 5 | 5 | 5 | 5 | 5 | 4 | 5 | 5 | 4 | 5 | 5 | 5 | 5 | 5 | 5 | 5 | 5 |
| Dry Rub - Index Finger | 3 | 2 | 5 | 3 | 5 | 2 | 5 | 1 | 5 | 4 | 5 | 3 | 5 | 2 | 5 | 1 | 5 | 1 | 5 | 1 | 5 | 2 | 5 | 2 | 5 | 1 | 5 | 1 |
| Penny Scratch Resistance | | 1 | | | | 1 | 2 | | 4 | 1 | | 1 | 3 | 1 | 1 | 2 | 5 | 4 | 4 | 1 | 2 | 2 | 2 | 2 | | 1 | | 1 |
| Adhesion | 3 | 2 | 5 | 4 | 5 | 1 | 5 | 1 | 5 | 4 | 5 | 4 | 5 | 1 | 3 | 1 | 3 | 1 | 3 | 1 | 4 | 1 | 4 | 1 | 4 | 1 | 5 | 1 |
| Smear Fastness | 2 | 1 | 3 | 1 | 3 | 1 | 3 | 1 | 3 | 1 | 3 | 1 | 3 | 1 | 2 | 2 | 2 | 1 | 3 | 1 | 2 | 1 | 2 | 1 | 3 | 1 | 3 | 1 |
| Wet Rub Resistance | 4 | 1 | 5 | 1 | 4 | 1 | 5 | 1 | 5 | 1 | 4 | 1 | 5 | 1 | 2 | 1 | 2 | 1 | 2 | 1 | 2 | 1 | 3 | 1 | 5 | 1 | 5 | 1 |

| Results Ink C & D | 2.1C | 2.1D | 2.2C | 2.2D | 2.3C | 2.3D | 2.4C | 2.4D | 2.5C | 2.5D | 2.6C | 2.6D | 2.7C | 2.7D | 2.8C | 2.8D | 2.9C | 2.9D | 2.10C | 2.10D | 2.11C | 2.11D | 2.12C | 2.12D | 2.13C | 2.13D | 2.14C | 2.14D |
|---|---|---|---|---|---|---|---|---|---|---|---|---|---|---|---|---|---|---|---|---|---|---|---|---|---|---|---|---|
| Substrates | 1 | | 2 | | 3 | | 4 | | 5 | | 6 | | 7 | | 8 | | 9 | | 10 | | 11 | | 12 | | 13 | | 14 | |
| Ink | C | D | C | D | C | D | C | D | C | D | C | D | C | D | C | D | C | D | C | D | C | D | C | D | C | D | C | D |
| Print Quality | 3 | 0 | 3 | 0 | 3 | 0 | 3 | 0 | 3 | 0 | 3 | 0 | 3 | 0 | 3 | 0 | 3 | 0 | 3 | 0 | 3 | 0 | 3 | 0 | 3 | 0 | 3 | 0 |
| Build-up | 5 | N/A | 5 | N/A | 5 | N/A | 5 | N/A | 5 | N/A | 5 | N/A | 5 | N/A | 5 | N/A | 5 | N/A | 5 | N/A | 5 | N/A | 5 | N/A | 5 | N/A | 5 | N/A |
| Decap | 4 | N/A | 4 | N/A | 4 | N/A | 4 | N/A | 4 | N/A | 4 | N/A | 4 | N/A | 4 | N/A | 4 | N/A | 4 | N/A | 4 | N/A | 4 | N/A | 4 | N/A | 4 | N/A |
| Water Resistance | 4 | 1 | 3 | 1 | 4 | 1 | 4 | 1 | 4 | 1 | 3 | 1 | 4 | 1 | 3 | 1 | 3 | 1 | 3 | 1 | 3 | 1 | 4 | 1 | 4 | 1 | 4 | 1 |
| Dry Rub - Q tip | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| Dry Rub - Index Finger | 5 | 2 | 5 | 1 | 4 | 2 | 5 | 2 | 5 | 2 | 5 | 1 | 5 | 1 | 5 | 1 | 5 | 1 | 5 | 1 | 5 | 1 | 5 | 1 | 5 | 1 | 5 | 1 |
| Penny Scratch Resistance | | 1 | | 4 | | 5 | | 2 | 4 | 5 | 5 | 5 | | 1 | 5 | 4 | 5 | 5 | 5 | 4 | 5 | 2 | 5 | 2 | 5 | 2 | 5 | 2 |
| Adhesion | 4 | 2 | 4 | 1 | 5 | 1 | 5 | 1 | 4 | 3 | 5 | 1 | 5 | 4 | 5 | 2 | 5 | 4 | 5 | 3 | 5 | 1 | 5 | 1 | 5 | 1 | 5 | 2 |
| Smear Fastness | 3 | 1 | 3 | 1 | 3 | 1 | 3 | 1 | 3 | 1 | 3 | 1 | 3 | 1 | 3 | 1 | 3 | 1 | 3 | 1 | 3 | 1 | 3 | 1 | 3 | 1 | 3 | 1 |
| Wet Rub Resistance | 5 | 2 | 4 | 1 | 4 | 1 | 5 | 1 | 4 | 1 | 4 | 1 | 5 | 1 | 3 | 1 | 3 | 1 | 3 | 1 | 3 | 1 | 3 | 1 | 5 | 1 | 5 | 1 |

Fig. 3

INKJET INK COMPOSITION

BACKGROUND OF THE INVENTION

1. Field of the Invention

The present invention relates to a composition for a water-based inkjet printer ink for printing images that can be retained on a wide range of porous and non-porous substrates. More particularly, the present invention relates to an improved water-based inkjet printer ink that contains a pigment colorant, that is free of polymeric binders, that can be utilized in a variety of printhead configurations for printing on different substrates, and that enables successful and reliable printhead operation for longer periods of time than water-based inkjet inks containing polymeric binders.

2. Description of the Related Art

Ink-jet printing is a non-impact printing technique in which droplets of ink are ejected through a very small nozzle onto a substrate without bringing the nozzle into contact with the substrate.

There are many demanding performance requirements for dyes and inks used in inkjet printing. For example they desirably provide sharp, non-feathered images having good water and lighffastness, as well as high optical density. The inks are often required to dry quickly when applied to a substrate, in order to prevent smudging, but they should not dry to form a crust over the tip of an ink-jet nozzle, which would stop the printer from working. The inks should also be storage stable over time without decomposing or forming a precipitate that could block the small inkjet nozzle.

The inkjet printing industry can be grouped into two broad market categories—desktop printing on the one hand, and commercial and industrial printing on the other hand. The desktop printing market category is based upon the use of inks that have been optimized primarily for printing documents and photographs. Commercial printing applications range from printing wide format posters, banners, and billboards, to product coding on cans and bottles. For present purposes, the printing of wide format graphics will be considered as commercial graphics. Industrial printing applications include direct mail, addressing, product coding, and marking.

The inks used in those applications have different requirements. In the desktop market, the print droplet must be tightly controlled. Additionally, desktop printers print on limited types of substrates. In commercial and industrial printers, on the other hand, a high premium is often placed on being able to print on a wide range of substrates. While print quality and image opacity are important in industrial markets, they are often of secondary importance. Industrial inkjet printing is an established, expanding market. Inkjet printers are widely used to place images on mail and business forms, on primary and secondary packaging.

Inkjet printers provide an inexpensive, reasonably fast, and relatively high quality image output. Inkjet printing involves withdrawing small quantities of ink from a reservoir, converting the ink into very small drops, and delivering the drops through the air to impact the surface of the substrate to be printed with the desired image.

Inkjet printing falls into two general categories: continuous inkjet printing and drop-on-demand inkjet printing. However, the greater volume of inkjet printing today utilizes a drop-on-demand method, which most often the type of inkjet printing done by home and office inkjet printers connected to personal computers, and it is less often used in commercial and industrial applications. The drop-on-demand category is further subdivided into the thermal inkjet method and the piezoelectric inkjet method.

Most consumer-type inkjet printers employ the thermal method and utilize a print cartridge having a series of tiny, electrically-heated chambers that are formed by photolithography. To produce an image, the printer runs a pulse of current through the heating elements. A steam explosion in the chamber forms a bubble, which propels a droplet of ink through a nozzle and onto the substrate, usually some type of paper. When the bubble condenses, surplus ink is pulled back up from the printing surface. The ink's surface tension pumps another charge of ink into the chamber through a narrow channel attached to an ink reservoir. In recent years, the thermal print-heads are being utilized more and more for industrial applications.

Historically, most commercial and industrial inkjet printers used a piezoelectric crystal in each nozzle instead of a heating element. When current is applied, the crystal bends, forcing a droplet of ink from the nozzle and projects it toward the substrate to be printed. Piezoelectric inkjet printing permits the use of a wider variety of different types of inks than does either thermal or continuous inkjet printing, but it is a more costly process. The emerging inkjet material deposition market uses inkjet technologies, typically piezoelectric inkjet, to deposit materials on substrates The continuous inkjet method is most often utilized for commercial printing or for applying markings on products and packages. In continuous inkjet technology, a high-pressure pump directs liquid ink from a reservoir through a small nozzle, creating a continuous stream of ink. A piezoelectric crystal causes the stream of liquid to break into droplets of uniform size at regular intervals. As they form, the ink droplets are subjected to an electrostatic field created by a charging electrode. The field is varied according to the degree of drop deflection desired. The result is a controlled, variable electrostatic charge on each droplet. Charged droplets are separated by one or more uncharged "guard droplets" to minimize electrostatic repulsion between neighboring droplets. In the so-called binary deflection method of continuous inkjet printing, the image is printed by the uncharged drops, while the charged drops are deflected into a catcher and are re-circulated. The primary advantage of that method is that the complex charging schemes needed to compensate for electrostatic and aerodynamic interactions between charged drops are avoided.

In another type of continuous inkjet printing, the so-called multiple deflection method, drops of ink are charged by an electrode located at the point of drop break-off, and are then deflected by high voltage plates to print a dot at a position proportional to the applied charging voltage. A primary advantage of the continuous inkjet method is the greater number of drops per unit time that are available per printing element.

Presently two principal types of inks are used in inkjet printing—water-based inks and solvent-based inks. There is a very small amount of UV-curable ink sold, but it represents an extremely small percentage of the total volume of industrial inks.

Current water-based inks tend to be the popular choice for inkjet printing on porous substrates, such as paper, corrugated board, and some untreated coated board. The inks run reliably, and penetration of the ink into the substrate can be controlled to a large degree. Additionally, water-based inks are environmentally friendly and are often the only types of inks that will run reliably in many different types of inkjet printheads. Although in some instances the permanence of water-based inks on substrates can be improved by the addition of resins or crosslinking polymers, the additional permanence is not deemed sufficient for many applications. More significantly, however, the use of resins or polymers as an inkjet ink component adversely affects the reliability of the printer by causing clogging of the small ink nozzles after a relatively short period of time.

Solvent continuous inks print on a wider range of substrates, and they tend to be used primarily on non-porous substrates. The solvent inks are often made of highly volatile solvents that evaporate and must be replenished. The solvent volatility leads to problems such as an odor that emanates from the printed substrate, and it requires that the printer have sufficient clearance to print with highly flammable, volatile fluids. Also, most solvent-based inkjet printers tend to print relatively crude images when compared with images produced with most water-based inks. There are solvent-based, drop-on-demand printers that can be used for printing on some porous substrates as well as on non-porous substrates.

For many industrial applications, variable deflection continuous ink printers are adequate despite the poor resulting print quality. There exist a wealth of inkjet formulation for these printers, the vast majority of which are based on low boiling point solvents such as MEK (methlyethylketone) and methanol. Those printers are designed to run resin-based inks, so the printing of permanent images on non-porous substrates is established and well known.

Water-based inkjet inks are typically not used to print on semi-porous and non-porous substrates in industrial applications, primarily because of the poorer adhesion of the ink to the substrate surface, often resulting in images that have unsatisfactory rub resistance.

The other type of continuous inkjet technology, binary array inkjet, successfully prints water-fast images only when running solvent inks. The limitations of the water-based ink formulations were one of the driving forces leading to the introduction of a solvent-based continuous inkjet array printer.

prop-on-demand printers have been successful in some industrial applications, but the inks used for those applications tend to be oil based, solvent based, or, more recently, UV-curable inks. In the late 1990's, thermal drop-on-demand inkjet technology was introduced into industrial markets. Initially aimed at mailing and addressing applications, it has more recently been used in packaging applications.

Inks for thermal drop printers tend to be largely composed of water. Although solvent based and UV-curable inks are known to be operable in those types of printers, the reliability of the inks is generally not acceptable in an industrial environment, where the productivity of the printer is especially important.

A further limitation of thermal drop printheads is that it is difficult to print using a sufficient quantity of a resin or polymeric binder to achieve any significant permanence on non-porous substrates, and also to maintain an acceptable level of printhead reliability. Typical problems associated with resins and polymeric binders include clogged jets when running after a period of time, and especially when restarting the printer after it has been idle for a period.

It is an object of the present invention to provide a water-based inkjet ink that can be utilized for printing on both porous and non-porous surfaces, and that also operates reliably on inkjet printers having different types of printheads.

SUMMARY OF THE INVENTION

The present invention relates to water-based inkjet ink compositions that are specifically tailored to the needs of the commercial and industrial markets and that are usable for successfully printing on porous substrates as well as on a variety of non-porous substrates.

Briefly stated, in accordance with one aspect of the present invention an aqueous inkjet ink composition is provided. The inkjet composition includes a pigment dispersion, an aqueous carrier medium, and a cosolvent combination. The cosolvent combination has solubility in water of at least 0.5% at 25° C., and is represented by the formula:

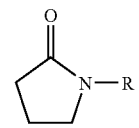

wherein R=—CH$_3$, —C$_2$H$_5$, —C$_3$H$_9$, —C$_4$H$_9$, —C$_5$H$_{11}$, —C$_6$H$_{13}$, —C$_7$H$_{15}$, or —C$_8$H$_{17}$, and together with the N atom to which it is attached forms part of a 5 member ring.

BRIEF DESCRIPTION OF THE DRAWINGS

The composition, results of tests, and the advantages of the present invention will become further apparent upon consideration of the following description, taken in conjunction with the accompanying drawings in which:

FIG. 1 is a table showing the compositions of two test inks of different colors in accordance with an embodiment of the invention and of two comparative inks.

FIG. 2 is a table showing the substrates on which inks in accordance with an embodiment of the invention were printed on test specimens and the corresponding reference numbers;

FIG. 3 is a table showing the results of several tests that were run on the printed substrates identified in FIG. 2 for the ink compositions identified in FIG. 1;

DESCRIPTION OF THE PREFERRED EMBODIMENTS

Figure 4:
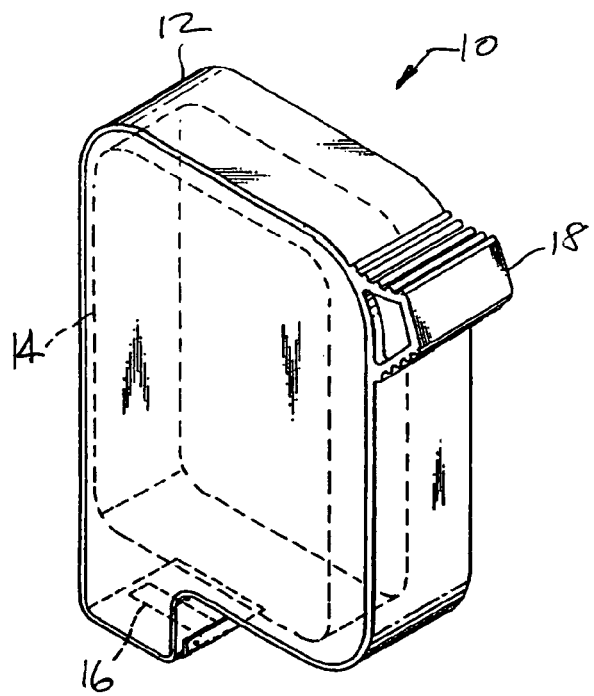
FIG. 4 is a front perspective view of one form of disposable inkjet ink cartridge in which the ink in accordance with the present invention can be packaged for use.

The inks in accordance with the present invention allow commercial and industrial printers to use printheads that have been designed to be used with water-based inks, and to print on non-porous substrates permanent images that for the most part have only been able to be printed in the past using solvent-based inks. The substrates include materials such as PVC, varnished board, aqueous coated paper and card stock, wet lumber, treated coextruded polyester film, treated asymmetrical polyester film, coated PVDC, Tyvek®, PET, and metallized polyester film.

Furthermore, because the inks in accordance with the invention include no traditional resins or crosslinking polymers, printers utilizing those inks exhibit operational reliability levels that are normally associated with water-based inks.

Further, in addition to running reliably, the inks in accordance with the invention can also be used to print water-fast images on semi-porous and non-porous substrates, as well as on porous substrates. It was surprisingly found that the addition of one of three pyrols to the ink formula provided the desired operability and image permanence. By some mechanism that is not fully understood, the use of the pyrols in accordance with the present invention allows certain dyes, and more importantly certain pigments, to attach to a number of varnishes and to the surfaces of some plastics, such as polyvinylchloride.

Others have described the use of pyrols in ink compositions. In that regard, pyrols generally are known to help improve the solubility of certain dyes. Pyrols have also been identified as one of a number of chemicals that can abrade a substrate surface to help improve permanence. The distinction in the present invention is that the ink compositions including the particular pyrols that are identified herein require no resin binder to achieve the desired level of image permanence on even non-porous substrates.

The present invention relates to water-based ink compositions for use in both continuous and drop-on-demand printers. To date, those ink compositions have been proven in thermal inkjet heads. But more significantly, testing has shown the technical feasibility of operating industrial inkjet printers with those inks. The inks are water based, and the colorants are primarily pigments, although good results can also be achieved using a limited number of dyes as colorants. The inks print water resistant, wet-rub-resistant images on non-porous substrates, and also allow printer reliability levels not known with known water-fast, wet-rub-resistant inks. As a result, inkjet printers using inks in accordance with the present invention are capable of printing acceptable images on semi-porous and non-porous substrates, on which it has not previously been possible to successfully print inkjet images.

An ink composition was prepared from the components identified below. All components except for the pigments were first combined in a mixing vessel, after which the pigment dispersion was added while stirring. The primary components of the ink composition include a colorant in the form of a pigment dispersion, an aqueous carrier medium, and a pyrrolidone derivative cosolvent, along with small amounts of minor components that can include surfactants, preservatives, and biocides.

The pyrrolidone derivative cosolvents that have surprisingly and unexpectedly been found to be particularly effective to achieve the desired results in a water-based ink composition are n-ethyl-pyrrolidone (NEP) and n-octyl-pyrrolidone (NOP). Those components can be obtained from BASF Corporation, of Florham Park, N.J.

The aqueous inkjet ink composition of this invention includes a pigment. The pigment is alternatively an organic pigment, an inorganic pigment, an organic/inorganic composite pigment, or mixtures thereof. By "organic pigment" herein is meant a pigment that is predominantly an organic compound or mixture of organic compounds, explicitly including carbon black. Suitable organic pigments include, for example, anthroquinones, phthalocyanine blues, phthalocyanine greens, diazos, monoazos, heterocyclic yellows, pyranthrones, quinacridone pigments, dioxazine pigments, indigo, thioindigo pigments, perynone pigments, perylene pigments, isoindolene, polymer particles having at least one void, and the like. Carbon black is the generic name for small particle size carbon particles formed in the gas phase by the thermal decomposition of hydrocarbons and includes, for example, materials known in the art as furnace black, lampblack, channel black, acetylene black. Carbon black additionally encompasses treated, modified, and oxidized carbon black. Suitable inorganic pigments include titanium dioxide, iron oxide, and other metal powders. Examples of suitable pigments include carboxylated black pigment dispersions such as Acryjet Extreme Black 125, from Rohm & Haas Corp, of Philadelphia, Pa., and CAB-O-JET 300, from Cabot Corporation, of Billerica, Mass., sulphonated color pigment dispersions such as CAB-O-JET 250 C cyan and CAB-O-JET 1027R red from Cabot Corporation, and carboxylated color pigment dispersions such as IJX 740 yellow, from Cabot Corporation.

Generally, the amount of pigment(s) used is from 1% to 15%, preferably from 2% to 8%, by weight based on the total weight of the ink. The pigment particle size must be sufficiently small that pigment particles will not clog the nozzles on the printing device in which the ink is to be used. Typical nozzle openings on ink jet printers are 10 to 60 microns in diameter. Preferably, the pigment particle size is from 0.02 to 2, more preferably from 0.02 to 1, and most preferably from 0.02 to 0.3 microns in diameter.

The aqueous inkjet ink composition of this invention includes a water-soluble surface agent. By "surface agent" herein is meant a material that interacts with the hydrophobic surface on which the ink composition is suitable for printing. Interaction with the surface is determined by placing a drop of the agent on the surface for one hour under a watch glass at room temperature and, immediately after removing the agent, visually observing the contacted area of the surface. Either surface distortion or loss of gloss, or both, is taken as interaction with the surface and the agent is thereby a surface agent. Preferred water-soluble surface agents are the monoalkyl ethers of certain alkylene glycols, wherein the alkyl is selected from $C_1$-$C_4$ alkyl and the alkylene glycol is selected from mono-, di-, and tri-ethylene glycol and mono-, di-, and tripropylene glycol; 2-pyrol; N-methylpyrollidone; sulfolane; and mixtures thereof. The amount of water-soluble surface agent in the ink is typically from 3% to 30%, preferably from 5% to 20%, and more preferably from 5% to 15%, by weight based on the total weight of the ink.

The inkjet ink composition can include a surfactant that aids in control of droplet formation, surface wetting and coalescence of droplets in the printed image. Anionic and non-ionic surfactants are preferred. Typically the amount of surfactant is effective to provide a surface tension of the inkjet ink composition of from 22 dynes/cm to 36 dynes/cm.

The inkjet ink composition can also include water-miscible or water-soluble materials such as humectants, chelating agents, defoamers, buffers, biocides, fungicides, viscosity modifiers, bactericides, surfactants, anti-curling agents, anti-bleed agents and surface tension modifiers, all as is known in the art. Useful humectants include ethylene glycol, 1,3 propanediol, 1,4 butanediol, 1,4 cyclohexanedimethanol, 1,5 pentanediol, 1,6 hexanediol, 1,8 octanediol, 1,2 propanediol, 1,2 butanediol, 1,3 butanediol, 2,3 butanediol, diethylene glycol, triethylene glycol, tetraethylene glycol, polyethylene glycol with average molecular weight of 200, 300, 400, 600, 900, 1000, 1500 and 2000, dipropylene glycol, polypropylene glycol with average molecular weight of 425, 725, 1000, and 2000, glycerol, 1,2,6-hexanetriol, sorbitol, 2-pyrrolidone, 1-methyl-2-pyrrolidone, 1-methyl-2-piperidone, N-ethylacetamide, N-methlpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, pantothenol, Liponic EG-1. Preferred humectants are polyethylene glycol with average molecular weight of 200 to 1000, glycerol, 1,2,6-hexanetriol, and sorbitol.

The amount of humectant used in the ink typically ranges from 1% to 30%, preferably from 5% to 15%, by weight, based on the total weight of the ink.

The aqueous inkjet ink composition of the invention typically has a viscosity of from 1.5 cps to 60 cps and a preferred viscosity of from 1.5 cps to 5 cps, particularly for certain low energy piezo printing heads. Moreover, the ink has a surface tension in the range of about 15 dyne/cm to about 40 dyne/cm at 25° C.

The ink composition can be applied to various types of substrates, both porous and nonporous, including the following: paper substrates, such as coated and uncoated paper; coated and uncoated paperboard; aqueous coated paper and cardstock; varnished board; plastics, such as vinyl, polyolefin, and polypropylene; wood and wet lumber; Tyvec®; and metal substrates such as metal foils. Examples of suitable substrates include cardboard, paperboard, corrugated paperboard, Tyvec®, Aqueous Cork Satin on 120# Centura Gloss Cover, Aqueous Gans Satin on 120# Centura Gloss Cover, Aqueous Cork Matte Dull on 120# Centura Gloss Cover, Aqueous Cork Gloss on 120# Centura Gloss Cover, Aqueous Gans Gloss on 120# Centura Gloss Cover, Aqueous NiCoat Hi Gloss on 120# Centura Gloss Cover, Aqueous Prisco Gloss on 120# Centura Gloss Cover, Aqueous Diamond Varnish on 120# Centura Gloss Cover, Gans Special Dull Varnish on 120# Centura gloss Cover, Gans Satin OP Varnish on 120# Centura Gloss Cover, Ink Systems S/F—HD—Gloss OP Varnish on 120# Centura Gloss Cover, Ink Systems SF. HI Gloss O/P Varnish on 120# Centura Gloss Cover, Untreated PVC, and pearlized PVDC.

The inks in accordance with the present invention are unique in that they appear to be able to crosslink a pigment to the surface of a substrate, including nonporous substrates, without the use of otherwise commonly employed resins. Various tests were performed directed to ascertaining the operational printing characteristics of the inks and the permanence properties and adhesion of resulting printed images on various substrates. The compositions of the inks that were tested are presented in FIG. 1, and the substrates on which printing tests were conducted are identified in FIG. 2. The nature of those tests and the test evaluation criteria are noted below. The test results are summarized in FIG. 3.

Printing Test

Print quality was determined by printing a test pattern and observing the test pattern so printed. The image was printed at 600 dpi×300 dpi on the substrates identified in FIG. 2. The printed images were inspected with magnifying glasses for "white lines." Typically, the presence of white lines suggests poor wetting. Samples were rated as follows:

0-1=poor—large number of "white lines" present;
2-3=fair—few number of "white lines" present; and
4-5=good—no "white lines" present.

Build-Up Test

Build-up is a measure of the amount of ink residue left on the nozzle-plate of a thermal ink jet pen after the pen has undergone a 100% printout test. The rating criteria were as follows:

0-1=poor—significant amount of ink residue—covered nozzle-plate;
2-3=fair—small amount of ink residue—partially covered nozzle-plate; and
4-5=good—no significant amount of ink residue on the nozzle-plate.

Most preferably, from the standpoint of long pen life, there is no residue.

Decap Time Test

The decap time of the ink is the amount of time a printhead can be left uncapped and idle before the nozzles will clog. A nozzle can become clogged by ink vehicle evaporation, which leaves behind a deposit of nonvolatile ingredients that are detrimental to jetting performance. If a nozzle has clogged, ink droplets ejected through the nozzle orifice can be misdirected, which can adversely affect print quality. If the orifice is completely blocked, ink droplets will not pass at all through the affected nozzle.

Decap time was measured by filling an HP45A ink cartridge with the respective inks and placing the cartridge into a printer that was equipped with software to operate the pen in a non-serviced mode, that is, not capped, wiped, or fired at the service station during the test. Just prior to the beginning of the test, the nozzles were primed and a nozzle check pattern was performed to ensure that all nozzles were firing acceptably. No further servicing was then conducted. Decap time was assessed by the presence or absence of the initial character of the printed image, after the printer remained dormant for various lengths of time. The characteristics of the resulting image were evaluated according to the following scale based upon time from the printing of a first image to the time a second image was printed:

1—The print quality of the initial character deteriorated in less than 30 minutes of dormancy;
2—The print quality of the initial character did not deteriorate after sitting dormant for one hour;
3—The print quality of the initial character did not deteriorate after sitting dormant for 3 hours;
4—The print quality of the initial character did not deteriorate after sitting dormant for 6 hours; and
5—The print quality of the initial character did not deteriorate after sitting dormant for 12 hours or more.

In addition to the above-noted tests of the ink and its operability, the following tests were conducted on printed images. The water resistance, wet rub resistance, dry rub resistance, and smear fastness tests were performed on the draw-downs of the ink compositions identified in FIG. 1, compositions A, B, C, and D, respectively, for each of the substrates identified in FIG. 2.

Water Resistance Test:

As used herein, "water resistance" refers to the resistance of a print to blurring when contacted with drops of water. A printed page should not become blurred or illegible if wetted.

To determine water-fastness, the substrate was held at an inclination to the horizontal of about 45 degrees. Two drops of water—one on top of the other—were allowed to drip onto and run across the inclined image. That process was carried out 10 seconds, 10 minutes, and 1 hour after printing. The resulting image was inspected for water-fastness according to the following scale, and the highest applicable ranking was determined:

1—running of the image is severe when tested at 1 hour (or longer);
2—running of the image is evident when tested at 1 hour (or longer);
3—no indication of running of the image is evident when tested at 1 hour;
4—no indication of running of the image is evident when tested at 10 minutes; and
5—no indication of running of the image is evident when tested at 10 seconds.

Wet Rub Resistance Test:

A wet rub resistance test was carried out by placing a water droplet on the sample and allowing it to stand for 5 minutes, after which the excess water was wiped off with a Kimwipe. The so-treated image area was then rubbed with a dry Kimwipe for 4 passes under a consistent pressure of about 8 psi.

The wet rub resistance was characterized by evaluating the degree of smudging and was rated according to the following scale:
1—ink completely rubbed off with pickup on the Kimwipe;
2—extensive smudging, heavy pickup of ink on the Kimwipe;
3—moderate smudging, a spot remains from the water droplet, and a moderate amount of ink on the Kimwipe;
4—slight smudging, slight amount of ink on the Kimwipe; and
5—no smudging, no ink on the Kimwipe.

Dry Rub Resistance Test:

A. Q-tip Rub Test

The dry rub resistance test was carried out by rubbing the samples with a dry Q-tip for 4 passes under a consistent pressure of about 4 psi. The color loss in the treated sample area and the color transfer to the Q-tip were examined visually. A rating of the dry rub resistance was given based upon the following scale:
1—almost complete color loss and color transfer;
2—large amount of color loss and color transfer;
3—some color loss and color transfer;
4—visible amount of color loss and/or color transfer; and
5—hardly visible amount of color loss and/or color transfer.

B. Index Finger Rub Test

The dry rub resistance test was carried out by rubbing the samples with an index finger using two passes under a consistent pressure of about 8 psi. The color loss in the treated sample area and the color transfer to the index finer were examined visually and a rating of the dry rub resistance was given as follows on a scale:
1—almost complete color loss and color transfer
2—large amount of color loss and color transfer
3—some color loss and color transfer
4—visible amount of color loss and/or color transfer
5—hardly visible amount of color loss and/or color transfer Smear Resistance Test:

As used herein, "smear resistance" refers to the resistance of an image to blurring when stroked with a highlighter marker. To determine smear, two strokes from a highlighter, one on top of the other, were drawn across the sample. That process was carried out on different parts of the test image at ten seconds, ten minutes, and one hour. The image was inspected for smear-fastness according to the following scale, and the highest applicable ranking was determined:
1—smearing is severe at 1 hour;
2—if smear is evident when tested at 1 hour;
3—no indication of smear is evident when tested at 1 hour;
4—no indication of smear is evident when tested at 10 minute; and
5—no indication of smear is evident when tested at 10 seconds.

Coin Scratch Resistance Test

The penny scratch resistance test involved performing ten scratch cycles with a penny positioned at a 45 angle to the substrate. One scratch cycle consists of a scratch in one direction and then back to the point of origin.
1—almost complete color loss;
2—large amount of color loss;
3—some color loss;
4—visible amount of color loss; and
5—hardly visible amount of color loss.

Adhesion Test

A strip of Scotch® Brand transparent cellophane tape (3M Catalog No. 610) was applied to the substrate surface and smoothed with thumb and forefinger to ensure good contact. To facilitate separation of the tape strip after application, one end was doubled over. While holding down the sample with one hand, the tape was peeled back at an angle of 180° in one smooth movement. The tape was applied onto a white substrate for evaluation of the amount of the image that was removed from the substrate by the tape.
1—almost complete color loss and color transfer;
2—large amount of color loss and color transfer;
3—some color loss and color transfer;
4—hardly visible amount of color loss on substrate and visible color transfer on tape; and
5—hardly visible amount of color loss on substrate and color transfer on tape.

The results of each of the above tests for each of the samples of inks and substrates is presented in FIG. 3. An average of the ink performance on all of the substrates for each of inks A, B, C, and D and for each of the tests identified above was ascertained and is shown in Table 1 below in summary form.

TABLE 1

Summary of Ink Performance on Substrates 1 - 14

| Ink | A Black | B Comparative - Black | C Color | D Comparative - Color |
|---|---|---|---|---|
| Print Quality | 4.79 | 0 | 3 | 0 |
| Build-up | 5 | N/A | 5 | N/A |
| Decap | 4 | N/A | 4 | N/A |
| Water Resistance | 3.64 | 1.79 | 3.57 | 1 |
| Dry Rub - Q-tip | 4.93 | 4.36 | 5 | 4.43 |
| Dry Rub - Index Finger | 3.93 | 1.93 | 3.79 | 1.29 |
| Penny Scratch Resistance | 3.86 | 1.5 | 4.71 | 3.5 |
| Adhesion | 4.21 | 2 | 4.64 | 3.64 |

An acceptable print quality with few to no lines was found for each of the ink compositions A and C in accordance with the present invention, whereas the print quality for comparative examples B and D were unacceptable. As is apparent, the addition to the ink composition of NEP and/or NOP significantly improved the image stability and retention quality. Furthermore, ink operability was found to be acceptable in that no ink build-up was observed on the nozzle-plate upon the 100% printout test. Because of the poor firing of comparative ink compositions B and D, the build-up test was not performed for those formulations.

Because the initial image quality for ink compositions B and D was found unacceptable, the decap time test was not performed. Ink composition A exhibited a decap time of 6 hours. A minor deterioration of the initial character was observed for ink composition C at the 6 hour test, indicating a decap time of a little under 6 hours. As will be noted, the addition of NEP and/or NOP to the ink composition considerably improved the decap time.

Formulations A and C with NEP or NOP also exhibited a water resistance of 3.64 and 3.57, respectively. On the other hand, the comparative ink formulations B and D exhibited a water resistance of 1.79 and 1, respectively, thus showing an enhanced water resistance when NEP or NOP was utilized in the ink composition.

Excellent Q-tip dry rub resistance was found for ink compositions both with and without NEP or NOP. When the dry rub resistance test was performed with an index finger, formulations A and C showed better rub resistance than the comparative ink formulations. The addition to the ink composition of NEP and/or NOP thus improved the index finger rub resistance.

A penny scratch resistance value of 3.86 versus 1.5 was found for ink formulation A, containing the NEP, and the comparative B formulation, respectively, indicating improved scratch resistance with the incorporation of NEP. A similar trend was found for the color formulation C including NOP and the comparative formulation D with values of 4.71 and 3.5, respectively. Because the color formulations C and D had generally higher values than the black formulations A and B indicates the capability of the pigment dispersion to resist penny scratch. Nevertheless, the addition of NEP and/or NOP also enhanced the penny scratch resistance of the test images.

An adhesion value of 4.21 versus 2 was found for black formulation A containing NEP and the comparative B formulation, respectively, indicating improved ink adhesion with the incorporation of NEP. A similar trend was found for the color formulation C containing NOP and the comparative D formulation, with values of 4.64 and 3.64, respectively. Because the color ink formulations C and D had generally higher adhesion values than the corresponding black ink formulations A and B indicates the adhesion characteristics of the colored pigment dispersions. Nevertheless, the addition of NEP and/or NOP to the ink compositions improved the ink adhesion.

The inks without NEP or NOP generally exhibited a smear rating of 1. But for the inks with NEP and/or NOP, the smear value improved to 2.64 and 2.71, respectively. Because it took the inks at least an hour to attain resistance to the highlighter, a rating of greater than 3 could not be applied to the ink compositions containing NEP or NOP. Nevertheless, a substantial and very noticeable improvement in smear resistance was found as a result of the addition of NEP or NOP.

The results shown in FIG. 3 and summarized in Table 1 above clearly show that the ink compositions in accordance with the present invention, as exemplified by ink samples A and C, possessed superior wet rub resistance. In contrast, the dried ink film resulting from the comparative ink compositions, samples B and D, had poor wet rub resistance.

From Table 1 above, it is also evident that the presence of NEP or NOP in the ink significantly improved the image durability under wet conditions compared with that of the inks without NEP or NOP.

Besides drop-on-demand thermal inkjet printing, NEP and/or NOP can also be utilized in ink compositions utilized in continuous and other drop-on-demand inkjet printers. Such use will provide improved image smear fastness, adhesion, water fastness, penny scratch resistance, and rub resistance under both wet and dry conditions. A sample formulation for the continuous binary deflections is provided in Table 2 below.

TABLE 2

| Components | Inkjet Technology Continuous-Flow Binary Multiple Jet Kodak 6240 |
| --- | --- |
| Water | 83.37 |
| Proxel | 0.1 |
| TEA | 3.2 |
| DMEA | 0.3 |
| Methanol | 0.25 |

TABLE 2-continued

| Components | Inkjet Technology Continuous-Flow Binary Multiple Jet Kodak 6240 |
| --- | --- |
| NOP | 0.15 |
| Surfynol 465 | 0.11 |
| DF-110L | 0.01 |
| Surfynol 104E | 0.01 |
| Orient 100-L | 12.5 |

The inkjet ink in accordance with the present invention can be utilized in a variety of inkjet printers. FIG. 4 shows one form of inkjet printing cartridge 10 in which the ink can be provided for use in a suitably configured printer (not shown). Cartridge 10 includes a plastic housing 12 that includes an internal reservoir 14, such a plastic bag, or the like, for storing ink. A printhead 16 that includes a plurality of inkjet nozzles is mounted to housing 12. Printhead 16 receives ink from reservoir 14 and ink droplets are ejected from the printhead during a printing operation. A protruding grip 18 extends from the front side of housing 12, thereby enabling convenient installation and removal of cartridge 10 from a print cartridge carriage (not shown) within an inkjet printer (not shown).

Figure 5:
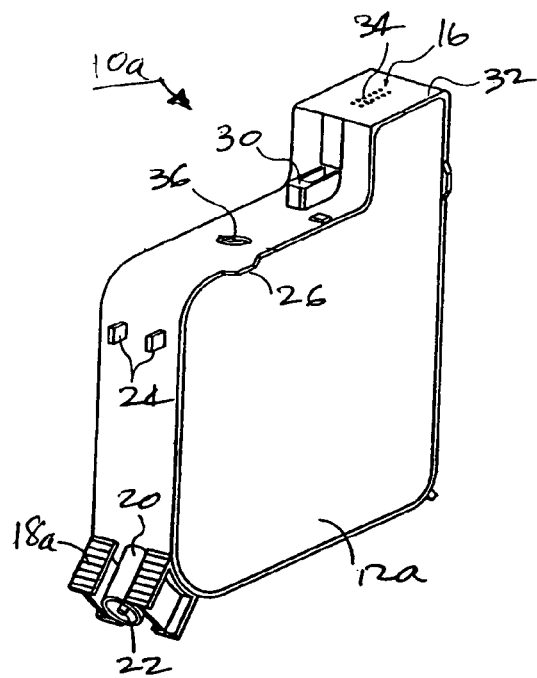
FIG. 5 is a front perspective view an ink cartridge generally similar to that of FIG. 4 but shown in an inverted view.

FIG. 5 shows an inverted view of an ink cartridge 10a that is structurally similar to that of FIG. 4. In that regard, components having the same reference numerals in the several figures also have the same structure and function. Cartridge 10a has a grip 18a that includes a sleeve 20 that surrounds a valve 22 a valve 22 that can be opened and closed. In an open state, ink from an external ink supply (not shown) can flow through valve 24 and into the ink reservoir within ink cartridge 10a.

Housing 12 can be formed of molded engineering plastic, such as the material marketed under the trademark "NORYL" by the General Electric Company, of Pittsfield, Mass. Positioning lugs 24, 26, 28, 30 can be provided at suitable points on the outer surface of housing 12 to enable proper positioning of the ink cartridge for filling during an initial filling operation, and also for proper positioning in a cartridge carriage in a printer so that the nozzles are accurately oriented for printing on a substrate.

Printhead 16 can be in the form of a strip of flexible tape 32 having a plurality of nozzles 34 formed in tape 32, such as by the use of laser ablation. One method for forming nozzles 34 is described in U.S. Pat. No. 5,305,015, entitled "Laser Ablated Nozzle Member for Inkjet Printhead," by Christopher Schantz et al., the disclosure of which is incorporated herein by reference. A fill opening 36 can provided for initially filling the ink reservoir in ink cartridge 10a. Opening 36 is later sealed with a steel ball, which is intended to be permanent.

Figure 6:
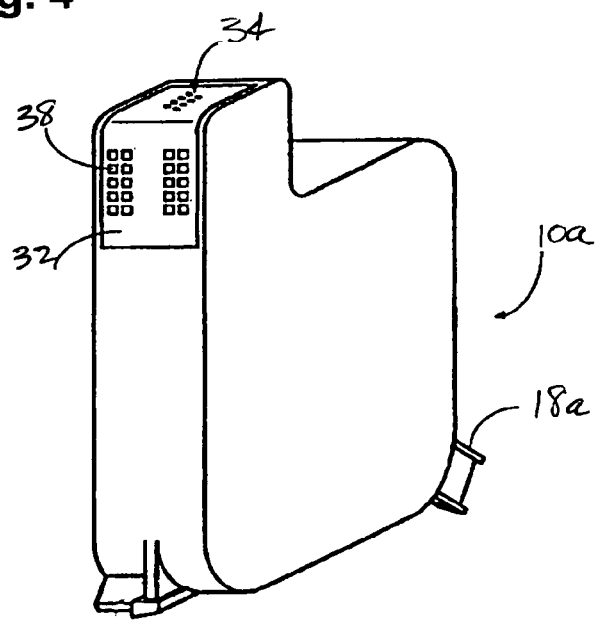
FIG. 6 is a rear perspective view of the ink cartridge of FIG. 5.

FIG. 6 shows a rear perspective view of ink cartridge 10a. The rear wall of cartridge 10a includes a plurality of electrical contact pads 38 that are formed on the outer face of the portion of flexible tape 32 that continues on the rear wall of the cartridge. Contact pads 38 are connected by means of electrical conduits formed on the underside of tape 32 to electrodes on a printhead substrate that is affixed to the underside of tape 32.

The ink cartridges shown in FIGS. 4 through 6 are merely illustrative examples. The ink described herein can also be utilized in inkjet cartridges having different configurations from those shown.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. An aqueous ink jet ink composition comprising:
   (a) a pigment dispersion containing from about 10 to about 30 parts of pigment;
   (b) an aqueous carrier medium containing from about 27.35 to about 86.48 parts of water;
   (c) from about 0.5 to about 30 parts of an n-ethyl pyrrolidone cosolvent combination having a solubility in water of at least about 0.5% at 25° C.;
   (d) from about 2 to 10 parts ethanol:
   (e) from about 0.5 to about 1 part of an aliphatic tertiary amine:
   (f) from about 0.01 to about 0.05 parts of isothiazolinone;
   (g) from about 0.01 to about 0.1 parts of fluorosurfactant;
   (h) from about 0.5 to about 1.5 parts of nonionic surfactant; and
   (i) wherein the ink composition is permanently adherent to nonporous substrates and is free of resins and polymers, and wherein all parts are by weight and wherein the sum of components (a)+(b)+(c)+(d)+(e)+(f)+(g)+(h) equals 100.

2. A pigment-based ink composition comprising:
   a) from about 0.1 to about 40 parts of a colorant;
   b) from about 0.5 to about 40 parts of an n-ethyl pyrrolidone cosolvent combination;
   c) from about 0 to about 15 parts of an organic solvent;
   d) from about 0 to about 5 parts of an amine;
   e) from about 0 to about 3 parts of a biocide;
   f) from about 0 to about 5 parts of a surfactant;
   g) from about 2 to about 99.4 parts of water; wherein all parts are by weight and wherein the sum of components a)+b)+c)+d)+e)+f)+g) equals 100; and
   h) wherein the ink composition is permanently adherent to nonporous substrates and is free of resins and polymers.

3. A composition according to claim 1, wherein the pigment dispersion includes a black pigment.

4. A composition according to claim 1, wherein the pigment dispersion includes an oxidized carbon black pigment.

5. A composition according to claim 1, wherein the pigment dispersion includes a carboxylated black pigment dispersion.

6. A composition according to claim 1, wherein the pigment dispersion includes a colored pigment.

7. A composition according to claim 1, wherein the pigment dispersion includes an oxidized color pigment dispersion.

8. A composition according to claim 1, wherein the pigment dispersion includes a sulphonated color pigment dispersion.

9. A composition according to claim 1, wherein the pigment dispersion includes a carboxylated color pigment dispersion.

10. A composition according to claim 2, wherein the organic solvent is an alcohol.

11. A composition according to claim 10, wherein the alcohol is ethanol.

12. A composition according to claim 2, wherein the biocide is isothiazolinone.

13. A composition according to claim 2, wherein the surfactant is a fluorosurfactant.

14. A composition according to claim 2, wherein the surfactant is a nonionic surfactant.

15. A composition according to claim 2, wherein the colorant is present in an amount of from about 10 to about 30 parts by weight.

16. A composition according to claim 2, wherein the cyclic amide is present in an amount of from about 0.5 to about 30 parts by weight.

17. A composition according to claim 2, wherein the organic solvent is present in an amount of from about 2 to about 10 parts by weight.

18. A composition according to claim 2, wherein the amine is present in an amount of from about 0.5 to about 1 part by weight.

19. A composition according to claim 2, wherein the biocide is present in an amount of from about 0.01 to about 0.05 parts by weight.

20. A composition according to claim 2, wherein the surfactant is present in an amount of from about 0.01 to about 1.6 parts by weight.

21. A composition in accordance with claim 1, wherein the composition has a surface tension of from about 15 dynes/cm to about 40 dynes/cm at 25° C., and has a viscosity of up to about 30 cps at 25° C.

22. An inkjet ink cartridge comprising:
   a) a housing having an enclosing outer surface and including an ink reservoir within the housing;
   b) an inkjet printhead carried on the outer surface and including a plurality of nozzles in communication with the ink reservoir; and
   c) an aqueous ink jet pigment-based ink composition including:
      (1) a pigment dispersion containing from about 10 to about 30 parts of pigment;
      (2) an aqueous carrier medium containing from about 27.35 to about 86.48 parts of water;
      (3) from about 0.5 to about 30 parts of an n-ethyl pyrrolidone cosolvent combination having a solubility in water of at least about 0.5% at 25° C.;
      (4) from about 2 to 10 parts ethanol;
      (5) from about 0.5 to about 1 part of an aliphatic tertiary amine;
      (6) from about 0.01 to about 0.05 parts of Isothiazolinone;
      (7) from about 0.01 to about 0.1 parts of fluorosurfactant;
      (8) from about 0.5 to about 1.5 parts of nonionic surfactant; and
      (9) wherein the ink composition is permanently adherent to nonporous substrates and is free of resins and polymers, and wherein all parts are by weight and wherein the sum of components (1)+(2)+(3)+(4)+(5)+(6)+(7)+(8) equals 100.

* * * * *